(12) United States Patent
Krauss et al.

(10) Patent No.: US 7,535,967 B2
(45) Date of Patent: *May 19, 2009

(54) METHOD AND APPARATUS FOR TRANSMISSION AND RECEPTION WITHIN AN OFDM COMMUNICATION SYSTEM

(75) Inventors: Thomas P. Krauss, Algonquin, IL (US); Kevin L. Baum, Rolling Meadows, IL (US); Vijay Nangia, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,186

(22) Filed: May 2, 2007

(65) Prior Publication Data

US 2007/0201572 A1 Aug. 30, 2007

Related U.S. Application Data

(62) Division of application No. 10/945,692, filed on Sep. 21, 2004, now Pat. No. 7,242,722.

(60) Provisional application No. 60/512,069, filed on Oct. 17, 2003.

(51) Int. Cl.
*H04K 1/10* (2006.01)
*H04L 27/28* (2006.01)

(52) U.S. Cl. .................. 375/260; 375/295; 370/491; 370/500

(58) Field of Classification Search .................. 375/130, 375/140, 146–147, 224, 340, 297, 295, 260; 370/206, 491, 500; 455/69, 522

See application file for complete search history.

(56) References Cited

U.S. PATENT DOCUMENTS

| | | | |
|---|---|---|---|
| 3,717,814 A | 2/1973 | Gans | |
| 4,146,838 A | 3/1979 | Takada | |
| 5,668,806 A * | 9/1997 | Arai et al. | 370/342 |
| 5,867,478 A | 2/1999 | Baum et al. | |
| 5,953,326 A * | 9/1999 | Nakamura et al. | 370/335 |
| 6,069,884 A * | 5/2000 | Hayashi et al. | 370/335 |
| 6,097,711 A * | 8/2000 | Okawa et al. | 370/335 |
| 6,307,850 B1 * | 10/2001 | Watanabe | 370/335 |
| 6,952,454 B1 | 10/2005 | Jalali et al. | |
| 2002/0080743 A1 | 6/2002 | Morita et al. | |
| 2002/0098815 A1 | 7/2002 | Hattori et al. | |
| 2002/0191535 A1 | 12/2002 | Sugiyama et al. | |
| 2003/0108087 A1 | 6/2003 | Shperling et al. | |
| 2003/0129985 A1 | 7/2003 | Naden et al. | |
| 2004/0180627 A1 | 9/2004 | Dabak et al. | |
| 2004/0204100 A1 | 10/2004 | Braithwaite | |
| 2007/0291701 A1 * | 12/2007 | Atarashi et al. | 370/335 |

OTHER PUBLICATIONS

Steiner, B.: "Time Domain Uplink Channel Estimation in Multicarrier-CDMA Mobile Radio System Concepts," Multicarrier Spread Spectrum, Kluwer Academic Publishers, pp. 153-160, 1997.

* cited by examiner

*Primary Examiner*—Jean B Corrielus (57) ABSTRACT

In an OFDM system the same Walsh code is used at the same time for a plurality of transmitters. The multiple transmitters can be from the same, or different devices (e.g., different base stations on the downlink, different terminals on the uplink). Each subcarrier/antenna combination will share a similar pilot Walsh code, except for the fact that the scrambled spread pilot signals will be phase shifted on some subcarriers of some antennas, based on the subcarrier/antenna combination.

3 Claims, 6 Drawing Sheets

METHOD AND APPARATUS FOR TRANSMISSION AND RECEPTION WITHIN AN OFDM COMMUNICATION SYSTEM

REFERENCE TO RELATED APPLICATION

The present application is a divisional application of non provisional application Ser No. 10/945,692, entitled "METHOD AND APPARATUS FOR TRANSMISSION AND RECEPTION WITHIN AN OFDM COMMUNICATION SYSTEM," filed on Sep. 21, 2004, issued as U.S. Pat. No. 7,242,722 on Jul. 10, 2007, which claims priority from provisional application Ser. No. 60/512,069, also entitled "METHOD AND APPARATUS FOR TRANSMISSION AND RECEPTION WITHIN AN OFDM COMMUNICATION SYSTEM," filed on Oct. 17, 2003.

FIELD OF THE INVENTION

The present invention relates generally to communication systems and in particular, to a method and apparatus for transmission and reception within a multicarrier communication system.

BACKGROUND OF THE INVENTION

Orthogonal Frequency Division Multiplexing (OFDM) is a well-known multicarrier modulation method that is used in several wireless system standards. Some of the systems using OFDM include 5 GHz high data rate wireless LANs (IEEE802.11a, HiperLan2, MMAC), digital audio and digital video broadcast in Europe (DAB and DVB-T, respectively), and broadband fixed wireless systems such as IEEE802.16a. An OFDM system divides the available bandwidth into very many narrow frequency bands (subcarriers), with data being transmitted in parallel on the subcarriers. Each subcarrier utilizes a different portion of the occupied frequency band.

Spreading can also be applied to the data in an OFDM system to provide various forms of multicarrier spread spectrum. Such spread-OFDM systems are generally referred to as either Spread OFDM (SOFDM), multicarrier CDMA (MC-CDMA), or Orthogonal Frequency Code Division Multiplexing (OFCDM). For systems employing MC-CDMA, spreading is applied in the frequency dimension and multiple signals (users) can occupy the same set of subcarriers by using different spreading codes. For OFCDM, different users are assigned different mutually orthogonal spreading codes, and the spread signals are combined prior to transmission on the downlink. Spreading can be applied in the frequency dimension, or the time dimension, or a combination of time and frequency spreading can be used. In any case, orthogonal codes such as Walsh codes are used for the spreading function, and multiple data symbols can be code multiplexed onto different Walsh codes (i.e., multi-code transmission).

For an OFCDM system with a spreading factor of SF in the time dimension, in which each symbol is represented by SF chips, up to SF Walsh codes can be active on each subcarrier. For channel estimation, one of these Walsh codes can be assigned as a pilot signal (i.e., in the same way that a pilot signal is created in conventional single-carrier CDMA systems such as IS-95). In order to estimate more than one channel (such as measuring the channels from two transmit antennas), additional Walsh channels can be assigned as pilot channels. However, note that assigning a second Walsh channel as a pilot doubles the pilot overhead of the system, leading to a reduction in the number of Walsh codes available for data transmission. This additional overhead is very significant in systems with a small spreading factor and/or a large number of transmit antennas. Therefore, a need exists for a method and apparatus for transmitting and receiving data from multiple antennas within an OFDM system that eliminates the need for multiple spreading codes being used for pilot channels emanating from multiple antennas.

DETAILED DESCRIPTION OF THE DRAWINGS

In order to address the above-mentioned need, the same Walsh code will be used at the same time for a plurality of transmitters. The multiple transmitters can be from the same, or different devices (e.g., different base stations on the downlink, different terminals on the uplink). Each subcarrier/antenna combination will share a similar pilot Walsh code, except for the fact that the scrambled spread pilot signals will be phase shifted on some subcarriers of some antennas, based on the subcarrier/antenna combination.

Because a single spreading code (e.g., Walsh code) can be used for pilot channels originating from differing antennas/subcarriers pilot overhead is greatly reduced. Additionally, with this choice of pilot channels, the channel responses of the different transmitters of interest become separable. In order to perform the separation, processing is preferably performed over all of the pilot subcarriers after despreading the pilot channel to separate the pilot from the data channels, as described below.

The present invention encompasses a method comprising the steps of determining a first subcarrier for spread pilot data transmission, determining a second subcarrier for spread pilot data transmission, and adjusting a phase of the spread pilot data a first amount to produce a first phase adjusted spread pilot. The phase of the spread pilot data is adjusted a second amount to produce a second phase-adjusted spread pilot and the first phase-adjusted spread pilot is transmitted on a first antenna/subcarrier combination. Finally the second phase-adjusted spread pilot is transmitted on a second antenna/subcarrier combination wherein the second amount differs from the first amount by a predetermined phase value based on the first and the second subcarrier/antenna combinations.

The present invention additionally encompasses a system comprising a first multicarrier transmitter outputting a first spread pilot signal over a first spreading block interval on a first plurality of subcarriers, and a second multicarrier transmitter outputting a second spread pilot signal on the first plurality of subcarriers within the spreading block interval, wherein for each of the plurality of subcarriers, the second spread pilot signal differs from the first pilot signal by a predetermined phase amount.

The present invention additionally encompasses a system comprising a first multicarrier transmitter outputting a first pilot signal on a first plurality of symbol periods on a first subcarrier, and a second multicarrier transmitter outputting a second pilot signal on the first plurality of symbol periods on the first subcarrier, wherein for each symbol period within the plurality of symbol periods, the first and the second pilot signals differ by a predetermined phase amount.

The present invention additionally encompasses a method comprising the steps of receiving a first multicarrier signal comprising a first spread pilot signal over a first spreading block interval on a first plurality of subcarriers, and receiving a second multicarrier signal comprising a second spread pilot signal on the first plurality of subcarriers within the spreading block interval, wherein for each of the plurality of subcarriers, the second spread pilot signal differs from the first pilot signal by a predetermined phase amount.

Finally, the present invention encompasses a method comprising the steps of receiving a first multicarrier transmission comprising a first pilot signal over a first plurality of symbol periods on a first subcarrier, and receiving a second multicarrier transmission comprising a second pilot signal over the first plurality of symbol periods on the first subcarrier, wherein for each symbol within the symbol period, the first and the second pilot differ by a predetermined phase amount.

Figure 1:
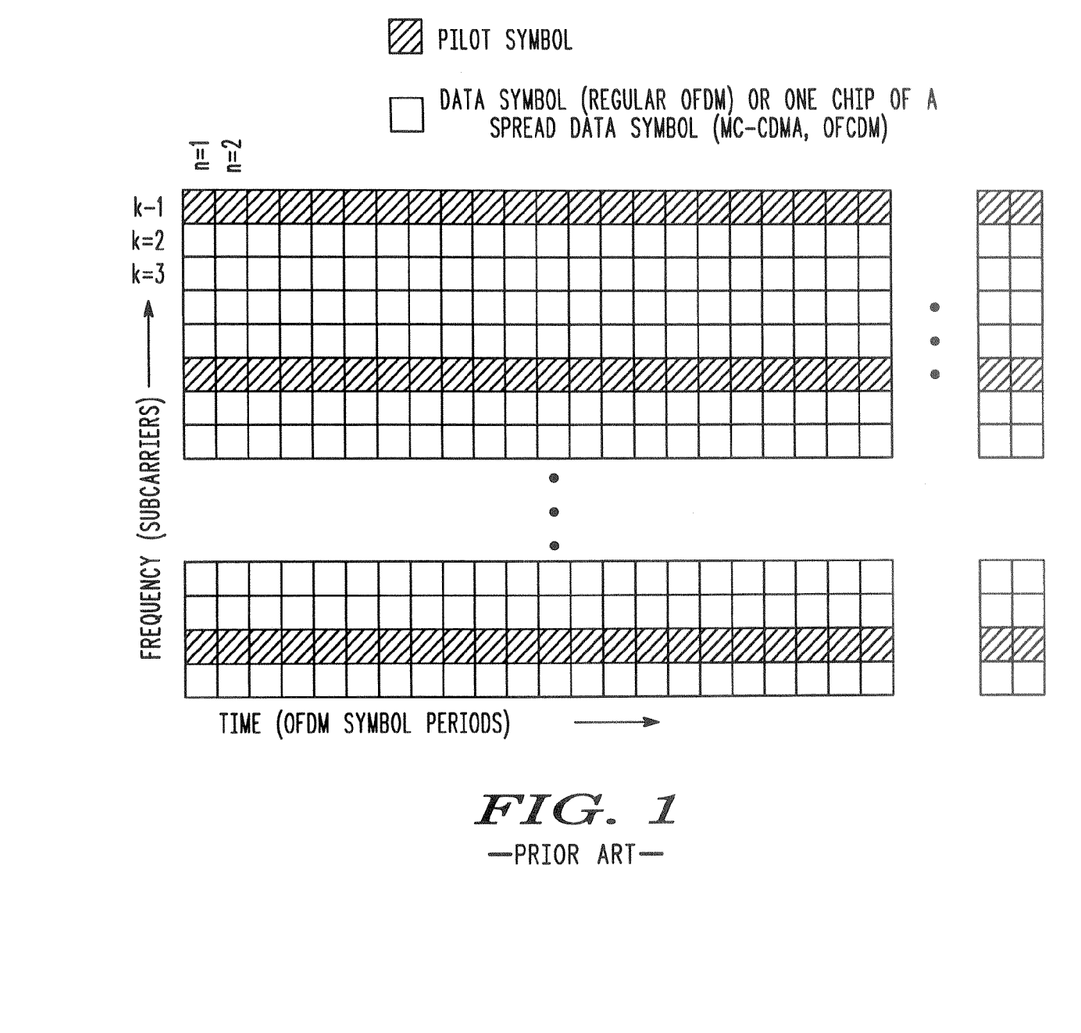
FIG. 1 through FIG. 3 show example techniques for including pilot symbols in an OFDM-based system.
Figure 2:
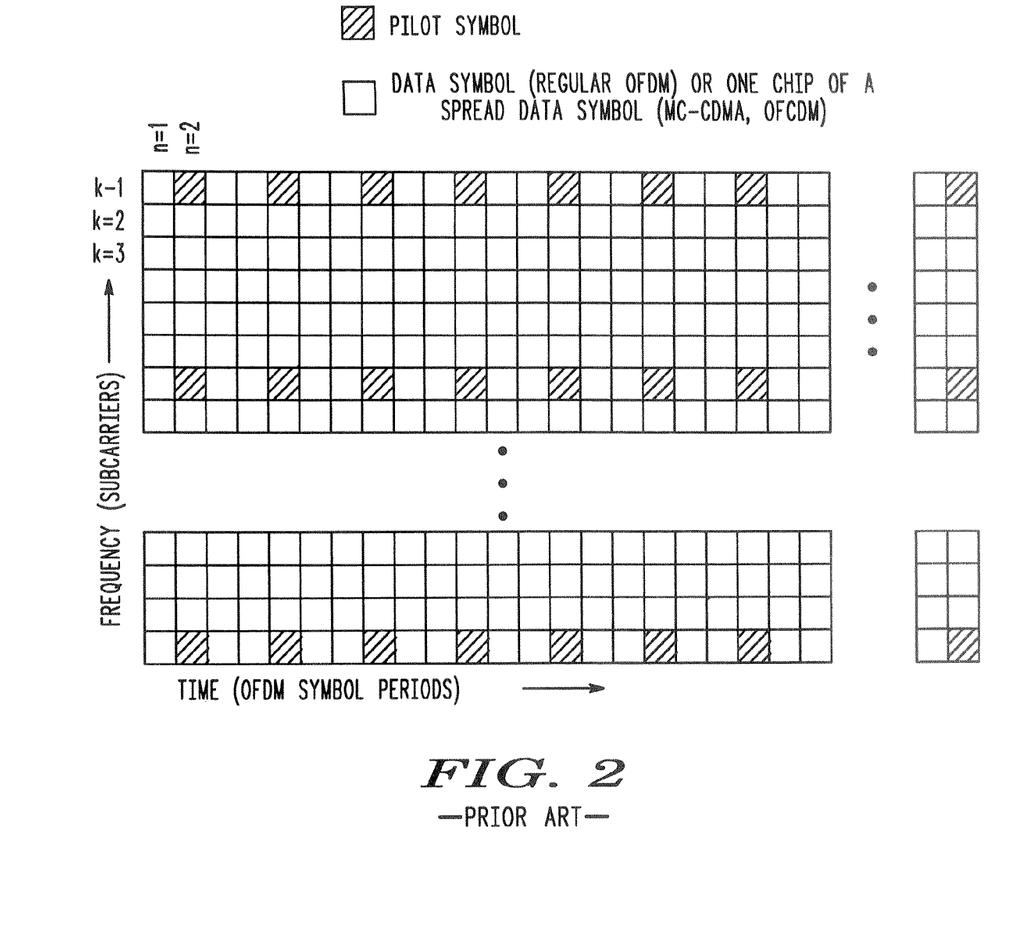

Turning now to the drawings, wherein like numerals designate like components, FIGS. 1 and 2 show examples of prior-art methods for including pilot symbols in an OFDM-based system. Note that these prior art methods can be used for systems that transmit regular OFDM data, or spread data (such as MC-CDMA, OFCDM). However, note that each individual pilot symbol occupies only "one subcarrier by one OFDM symbol period", and also note that the pilot and data are not code multiplexed. Instead, the pilot symbols are separated in time and/or frequency from the data. In these prior art methods, a channel estimate may be obtained at each pilot symbol location, which is separate from the data or spread data locations. Then, the channel may be estimated at other locations in the time-frequency grid, especially locations where data or spread data is located, so the data can be despread and detected. The pilot configuration shown in FIG. 1 is commonly known as a "pilot tone" based approach, since certain subcarriers contain only pilot symbols at each time interval. In FIG. 1, note that the subcarriers used for the pilot tones cannot be used for transmitting data. For the pilot tone approach, methods have been proposed for encoding the pilot tones such that multiple channels can be estimated, but these methods have limited utility since the number of required pilot tones is proportional to the number of channels to be estimated.

Figure 3:
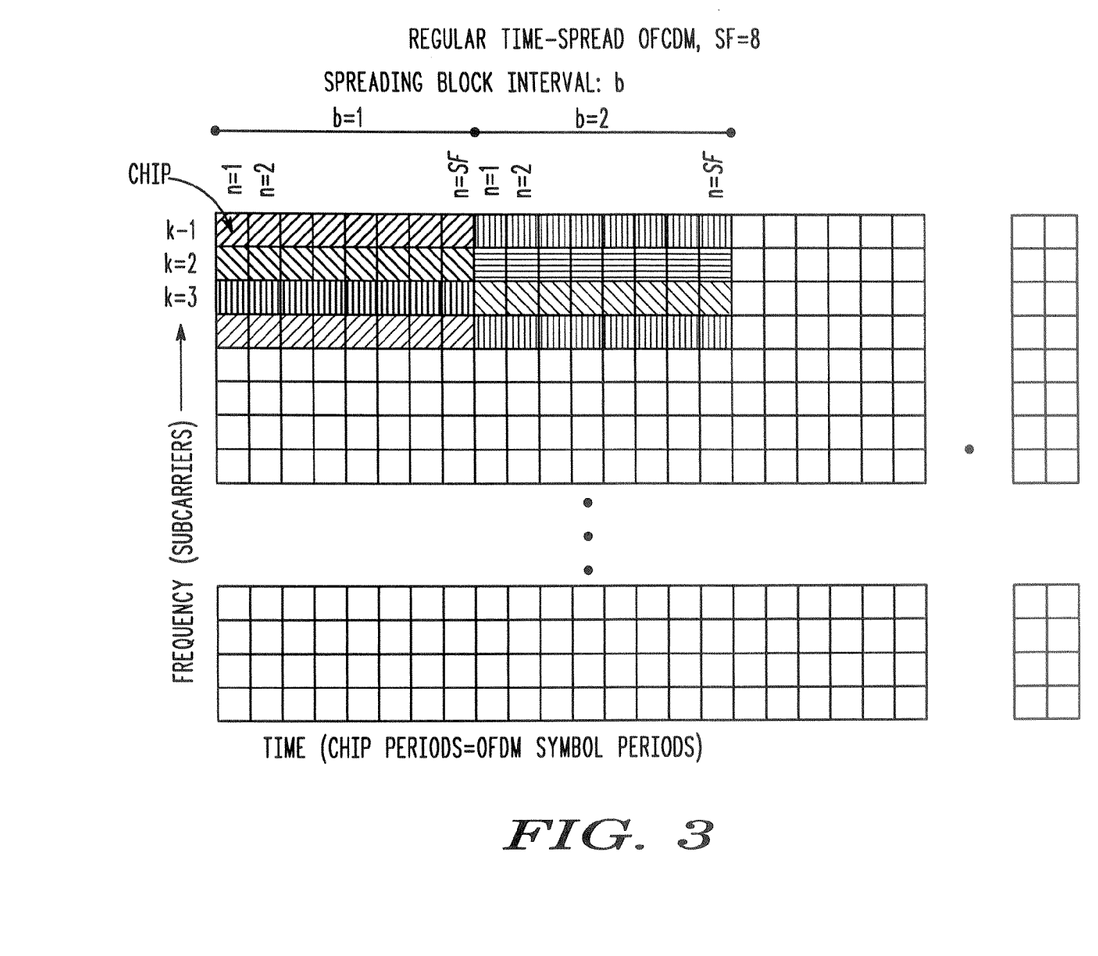

In contrast with the prior art methods of FIG. 1 and FIG. 2, the preferred embodiment of the present invention uses a spread pilot that is code multiplexed with spread data, as illustrated in FIG. 3. Particularly, FIG. 3 illustrates an OFCDM system with spreading in the time dimension. The time-frequency grid for this type of a system with SF=8 is shown where each symbol is spread with 8 chips. The eight chips are then transmitted on a particular frequency (subcarrier). As shown in FIG. 3, eight chips representing a first symbol are transmitted on subcarrier 1, followed by another eight chips representing another symbol. Similar transmissions occur on subcarriers 2 through 4. Up to SF symbols can be code multiplexed onto the same time/frequency space. For example, up to SF symbols can be code multiplexed onto the same subcarrier during a single spreading block interval, b. In a system with a code multiplexed pilot, at least one of the Walsh codes is used as a pilot channel. Note that in contrast to the pilot tone approach of FIG. 1, the code multiplexed approach enables both a pilot and user data to be simultaneously present on every subcarrier. If a pilot was included on every subcarrier in the pilot tone approach, note that the pilot overhead would be 100% and the system would not be able to transmit any user data.

The composite signal at a particular location in the time-frequency grid is described as $$x(b, n, k) = c(b, n, k)\left(\underbrace{A_p(b,k)d_p(b,k)W_p(n,k)}_{\text{pilot channel}} + \underbrace{\sum_{\substack{i \neq p \\ i=1:SF}} A_i(b,k)d_i(b,k)W_i(n,k)}_{\text{data channels}}\right)$$

where:
b is the spreading block interval index (note that b increases by one every SF OFDM symbol periods);
n is the chip index within the $b^{th}$ spreading block interval. Note that n increments from 1 to SF within each spreading block interval b;
k is the subcarrier index, $1 \leq k \leq K$;
c denotes the scrambling code;
i is the Walsh code index, $1 \leq i \leq SF$;
p denotes the Walsh code index that is used for the pilot channel;
$W_i$ denotes the $i^{th}$ Walsh code;
$A_i$ denotes the (real) gain applied to the $i^{th}$ Walsh code channel (e.g., based on power control settings, if any); and
$d_i$ denotes the complex data symbol that modulates the $i^{th}$ Walsh code. $d_p$ denotes the pilot symbol that modulates the $p^{th}$ Walsh code channel (i.e., the pilot channel).

As discussed above, for an OFCDM system with a spreading factor of SF in the time dimension, in which each symbol is represented by SF chips, up to SF Walsh codes can be active on each subcarrier. For channel estimation, one of these Walsh codes can be assigned as a pilot signal (i.e., in the same way that a pilot signal is created in conventional single-carrier CDMA systems such as IS-95). In order to estimate more than one channel (such as measuring the channels from two transmit antennas in systems with space-time coding, MIMO, beamforming, or other types of transmit antenna array processing, or when multiple transmitters are using the same channel), additional Walsh channels can be assigned as pilot channels. For example, Walsh code number 1 can be used for a pilot channel on antenna 1, Walsh code 2 can be used for a pilot channel on antenna 2, leaving Walsh codes 3 through SF available for data transmission. However, assigning a second Walsh channel as a pilot for the second antenna doubles the pilot overhead of the system, leading to a reduction in the number of Walsh codes available for data transmission. In order to address this issue, the present invention enables the same Walsh code to be used at the same time for a plurality of transmitters. The multiple transmitters can be from the same, or different devices (e.g., different base stations on the downlink, different terminals on the uplink). Each subcarrier/antenna combination will share a similar pilot Walsh code, except for the fact that the scrambled spread pilot signals will be phase shifted on some subcarriers of some antennas, based on the subcarrier/antenna combination.

The phases can be chosen as follows. Let the first transmitter's pilot channel (m=1) be chosen arbitrarily. Then, the other transmitters of interest (m>1) use a pilot channel derived as follows:

$$c_m(b, n, k)A_{p_m,m}(b, k)d_{p_m,m}(b, k)W_{p_m,m}(n, k) = c_1(b, n, k)$$
$$A_{p_1,1}(b, k)d_{p_1,1}(b, k)W_{p_1,1}(n, k) \underbrace{\exp\{-j2\pi\beta(k-1)(m-1)\}}_{\text{transmitter and subcarrier dependent phase}}$$

where β is a parameter less than 1. The value of β is related to the number of formula results in each pilot being shifted by a constant value multiplied by an integer (e.g., subcarrier index). For a system with an OFDM symbol period of Ts (excluding the cyclic prefix), the pilot format above will accommodate up to 1/β transmitters, assuming that the cyclic prefix length is at least βTs. Also, it is assumed that the channel impulse response length associated with each transmitter is less than βTs. When these conditions are satisfied, a receiver can separate the channel responses of the different transmitters using signal processing techniques, as will be described later. Note that if the assumed conditions are not satisfied, some distortion or crosstalk can occur between the channel estimates of the different transmitters. However, depending on the channel estimation accuracy required by the specific application, such distortion may be acceptable.

Note that the present invention provides a substantial improvement over a prior-art pilot tone based approach, which for example may have a pilot tone spacing of 5 subcarriers and would then only be able to estimate ⅕ as many channels as the preferred embodiment of the present invention. In order to match the capability of the present invention, the pilot tone spacing in the pilot tone approach must be reduced to 1 subcarrier, resulting in pilot tones on every subcarrier and leaving no subcarriers for user data transmission.

For simplicity, we also assume that the pilot channel power control gain value $A_{p_m m}(b,k)$ is the same on each transmitter of interest (i.e., the same for all m). The proposed method is still applicable if the A values are different, but the resulting channel estimates will be scaled by the ratio of the assumed A and the actual A. This scale factor can be removed if the relative or absolute A values are known (based on a signaling channel, for example).

Note that it is possible for the transmitters of interest to use different scrambling codes and a different Walsh index for the pilot channel, as long as the combination of the scrambling code and pilot Walsh code for each transmitter of interest is identical except for an arbitrary phase rotation. However, from a practical implementation perspective, the simplest way to satisfy the above equation is to use the same scrambling code and the same Walsh index in each transmitter of interest. In this latter case, the method can be implemented by appropriately modulating the pilot Walsh code, namely $$d_{p_m,m}(b,k) = \exp\{-j2\pi\beta(k-1)(m-1)\}d_{p_i,1}(b,k)$$

Because a single spreading code (e.g., Walsh code) can be used for pilot channels originating from differing antennas/subcarriers, pilot overhead is greatly reduced. Additionally, with this choice of pilot channels, the channel responses of the different transmitters of interest become separable. In order to perform the separation, processing is performed over all of the pilot subcarriers after despreading the pilot channel to separate the pilot from the data channels, as described below.

Figure 4:
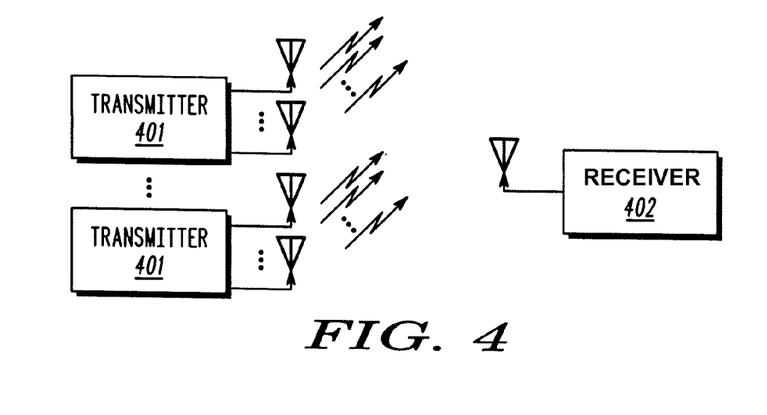
FIG. 4 is a block diagram of a transmitter.

FIG. 4 illustrates such a spread OFDM system. As is evident, multiple transmitters 401 utilize multiple antennas to transmit data on multiple subcarriers (frequencies) to receiver 402. In its simplest sense, multistream transmission can be thought of as the transmission of multiple data streams, from a single transmitter source, using multiple transmit antennas. Each data stream is transmitted utilizing one or more subcarriers and a spreading code. Receiver 402 receives and processes the signals to reconstruct the transmitted multistream data. As discussed above, each antenna requires a pilot channel for coherent demodulation. In order to reduce the number of pilot channels, a single pilot channel is utilized and the pilot signal on the pilot channel from the different antennas has its phase adjusted based on the antenna/subcarrier combination.

Figure 5:
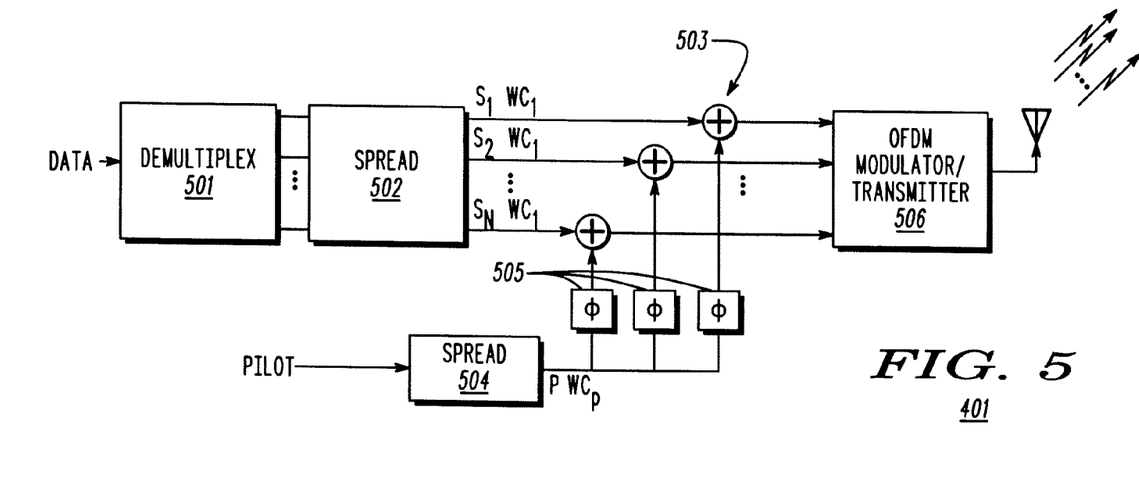
FIG. 5 is a more-detailed block diagram of a transmitter of FIG. 4.

FIG. 5 is a block diagram of transmitter 401. As shown, transmitter 401 comprises de-multiplexer 501, spreaders 502 and 504, phase shifter 505, and OFDM modulator/transmitter 506. For simplicity, data from a single user (e.g., uplink) or for a single user (e.g., downlink) is shown in FIG. 5, however one of ordinary skill in the art will recognize that in typical OFCDM transmitters, multiple users transmit (or are transmitted to) simultaneously with up to SF symbols occupying the same time/frequency space. During operation a data stream from/for a user enters de-multiplexer 501 where the data stream is de-multiplexed into a plurality of data streams. Typical de-multiplexing operations convert a data stream at a given data rate (R) into N data streams each having a data rate of R/N.

Continuing, the de-multiplexed data streams enter spreader 502 where standard spreading occurs, producing a plurality of chip streams. Particularly, for an example scenario where the data and spreading codes are binary, spreader 502 modulo 2 adds an orthogonal code (e.g., an 8 chip Walsh code) to data symbol. For example, in 8 chip spreading, data symbols are each replaced by an 8 chip spreading code or its inverse, depending on whether the data symbol was a 0 or 1. More generally, the spreading code is modulated by a complex data symbol, for example $d_i$ in the earlier equations; this complex data symbol may be selected from a M-ary QAM or M-ary PSK constellation, for example. The spreading code preferably corresponds to a Walsh code from an 8 by 8 Hadamard matrix wherein a Walsh code is a single row or column of the matrix. Thus, for each data stream, spreader 502 repetitively outputs a Walsh code modulated by the present input data symbol value. It should be noted that in alternate embodiments of the present invention additional spreading or other operations may occur by spreader 502. For example, power control and/or scrambling (with a real or complex scrambling code) may be done, as shown in the previous equation.

In the preferred embodiment of the present invention a single pilot per sub-channel is broadcast along with each symbol stream, providing channel estimation to aid in subsequent demodulation of multiple transmitted signals. The single pilot channel is utilized by all users receiving data during the particular frequency/time period. In an alternate embodiment, the number of channels that can be estimated can be further multiplied by allocating different pilot Walsh codes to different groups of transmitters. The channels of different groups of transmitters are then orthogonal in the code domain, while transmitters within a group are separable using the phase shifted pilot techniques as described in the preferred embodiment. In additional alternate embodiments of the present invention, the transmission of the pilot channel may be "skipped" at various time periods/subcarriers in order to transmit more data when the channel conditions allow. Such a skipping pattern can be either predetermined or adaptive. A receiver, knowing the sequence and time interval, utilizes this information in demodulating/decoding the non-pilot broadcasts, which preferably occur on different spreading codes than the pilot. Thus in the preferred embodiment of the present invention a pilot stream (comprising a known symbol pattern) enters spreader 504, where it is appropriately spread utilizing a code from the 8 orthogonal codes.

The pilot chip stream is then phase shifted via phase shifters 505. Note that the output of phase shifters 505 are normally complex values. That is, even if the spread pilot only contains a real component, the phase shift applied to the spread pilot can be a value that causes the output to contain both real and imaginary parts. The phase shifter operation can be modeled as multiplying the spread pilot by a complex value of exp(jφ), where the value of φ depends on the antenna/subcarrier pair.

Since "phase shifting" is implemented at complex baseband on several different subcarriers of a complex signal, it cannot be practically implemented with simple RF phase shifters. Instead, phase shifters 505 serve to modulate the spread pilot with a particular complex phasor/sinusoid, whose frequency and phase depend on the antenna/subcarrier combination. As discussed above, the amount of phase shifting will depend on the antenna/subcarrier combination. Note that the phase-shifted spread pilot chip stream can be generated in various ways that produce an equivalent result. For example, the phase shift could be applied to the pilot symbol prior to spreading, or to the chips after spreading, or it could be otherwise embedded in the spreading code or the pilot symbol. The phase-shifted pilot chip stream is then summed with each data chip stream via summers 503. It should be noted that data for more than one data stream may be summed at summers 503. In other words data for each user transmitted during the particular frequency/time period will have chips of multiple spreading codes summed at summers 503. The resulting summed chip stream is output to transmitter 506.

It should be noted that for simplicity only a single transmitter 401 is shown in FIG. 5, however, one of ordinary skill in the art will recognize simultaneous transmissions by multiple transmitters will be occurring. This results in at least a first transmitter outputting a first spread pilot signal over a first spreading block interval on a first plurality of subcarriers and a second transmitter outputting a second spread pilot signal on the first plurality of subcarriers within the spreading block interval, wherein for each of the plurality of subcarriers, the second spread pilot signal differs from the first pilot signal by a predetermined phase amount. As discussed above, shifting specific chip streams on the different subcarrier/antenna combinations (frequencies) allows for a single pilot channel code to be utilized amongst the various subcarrier/antenna combinations so that more of the Walsh codes can be allocated to data channels rather than pilot channels.

Figure 6:
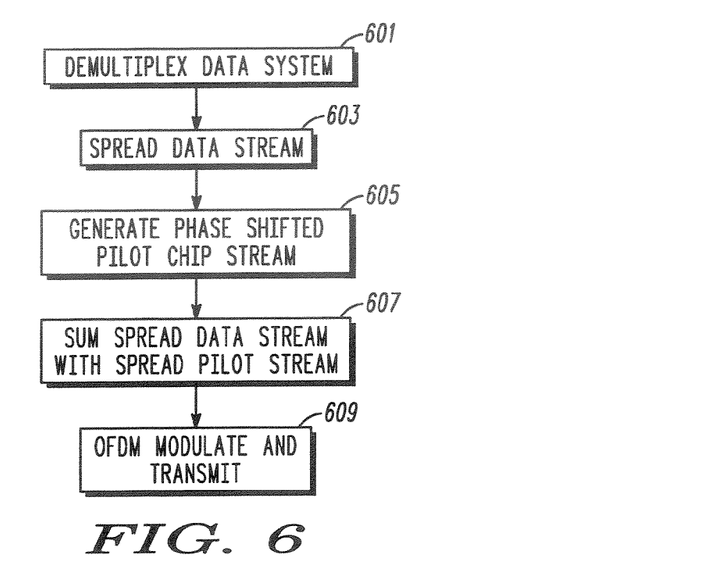
FIG. 6 is a flow chart showing operation of the transmitter of FIG. 5.

FIG. 6 is a flow chart showing operation of the transmitter of FIG. 5 in accordance with the preferred embodiment of the present invention. The logic flow begins at step 601 where a data stream from/for a user is de-multiplexed into a plurality of data streams. At step 603 each data stream is spread with a particular spreading code. Simultaneously, at step 605 the pilot stream is spread with a particular spreading code and is phased shifted dependent upon the particular subcarrier and antenna that it is to be broadcasted on. Note that the phase shift can be implemented in various ways that produce an equivalent result. For example, the phase shift could be applied to the pilot symbol prior to spreading, or to the chips after spreading, or it could be otherwise embedded in the spreading code or the pilot symbol. At step 607 the spread data streams are summed with the phase-shifted pilot streams. Finally at step 609 OFDM modulation and transmission occurs. The above-described procedure takes place for preferably all, but at least some pilot transmissions in the system. For example, for two differing pilot transmissions, the subcarriers are determined and the phase of the first spread pilot data is adjusted a first amount (which may be zero) and transmitted while the phase of the second spread pilot data is adjusted a second amount and transmitted. As discussed above, the phase adjustment is based on an antenna/subcarrier combination. Also note, that each subcarrier may be transmitted on the same antenna or, that a single subcarrier may be transmitted on differing antennas.

Figure 7:
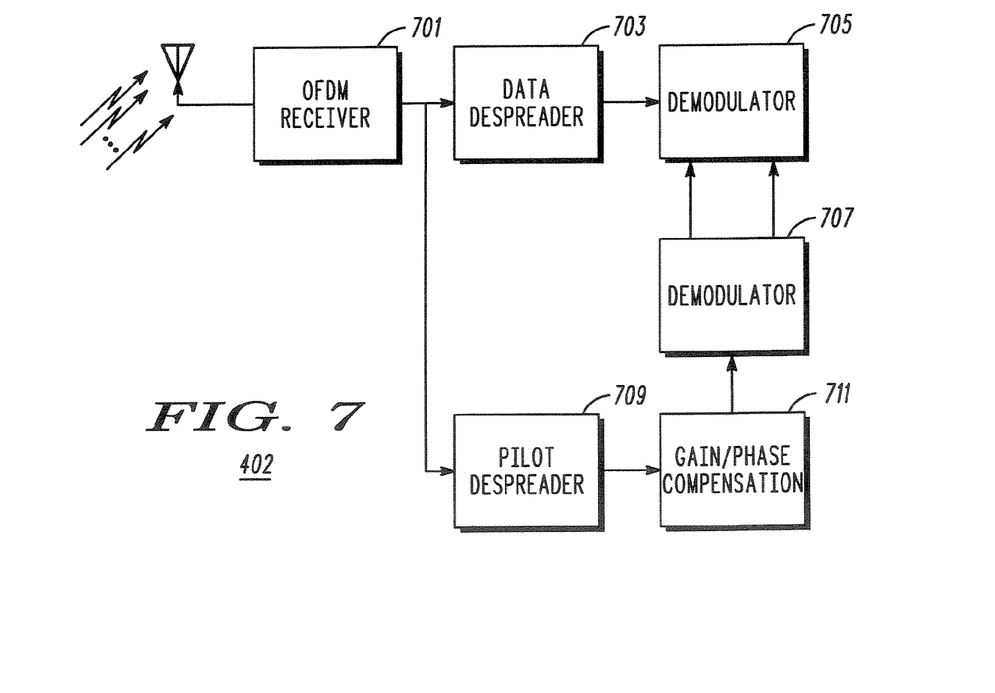
FIG. 7 is a block diagram of a receiver.

FIG. 7 is a block diagram of receiver 402. Receiver 402 is designed to receive a first multicarrier signal comprising a first spread pilot signal over a first spreading block interval (or symbol period) on a first plurality of subcarriers and a second multicarrier signal comprising a second spread pilot signal on the first plurality of subcarriers within the spreading block interval (or symbol period). As discussed above, for each of the plurality of subcarriers, the second spread pilot signal differs from the first pilot signal by a predetermined phase amount.

As shown, receiver 402 comprises OFDM receiver 701, data despreader 703, demodulator 705, filter 707, pilot despreader 709, and gain/phase compensation circuitry 711. During operation, the Walsh codes are reordered so that the pilots are sent on the first Walsh code (it should be clarified that this is only assumed here for notational convenience—there is no need to use any particular Walsh code for pilot transmission), which is the same on all antennas. Hence the received signal (with the block index b implicit) is given by $$x_m(n,k) = c(n,k) \left( \underbrace{e^{-j2\pi\beta(k-1)(m-1)}A(k)d_{p_1,1}(k)W_1(n,k)}_{\text{pilot channel}} + \underbrace{\sum_{i=2}^{SF} A_{i,m}(k)d_{i,m}(b,k)W_{i,m}(n,k)}_{\text{data channels}} \right)$$

where it is assumed the scrambling code is the same across all antennas, and the pilot channel power control gain value is the same on all antennas and is defined $A(k)=A_{p_m,m}(b,k)$.

The received signal is given by $$r(n,k) = \sum_{m=1}^{M_T} h_m(n,k)x_m(n,k) + \eta(n,k)$$

where $M_T$ is the number of transmit antennas, $h_m(n,k)$ is the channel for the $m^{th}$ antenna, and $\eta(n,k)$ is thermal noise at the $n^{th}$ OFDM symbol, $k^{th}$ subcarrier. During operation, OFDM receiver 701 receives multiple subcarriers (multicarrier signal) and demodulates them producing a plurality of chip streams. The pilot channel is despread via despreader 709 by multiplying the received signal by the conjugate of the pilot's Walsh code times the scrambling code and summing the elements. The pilot symbols are then demodulated via gain/phase compensation circuitry 711 by dividing out the gain and pilot symbol:

$$\hat{h}(k) = \frac{1}{A(k)} \cdot \frac{1}{d_{p_1,1}(k)} \cdot \frac{1}{SF}\sum_{n=1}^{SF} c^*(n,k)W_1^*(n,k)r(n,k)$$

Now assuming the channel is approximately constant during the spreading block, the data channels cancel due to the orthogonality of the Walsh codes, leaving $$\hat{h}(k) = \sum_{m=1}^{M_T} h_m(n,k)e^{-j2\pi\beta(k-1)(m-1)} + \eta'(k)$$

where $$\eta'(k) = \frac{1}{A(k)} \cdot \frac{1}{d_{p_1,1}(k)} \cdot \frac{1}{SF}\sum_{n=1}^{SF} c^*(n,k)W_1^*(n,k)\eta(n,k)$$

is the despread noise contribution.

Note that $\hat{h}(k)$ has contributions from each antenna, but the channels are each multiplied by a complex exponential "phase-ramp" across subcarrier index k, where the slope of the ramp is given by the antenna index m. This is the key property that allows separation of the multiple antennas that all use the same pilot code. It relies on the lowpass nature of the channel $h_m(n,k)$ across subcarrier k due to the limited delay-spread of the channels.

The channels for each antenna may be obtained via filter 707 by filtering that can be implemented in several ways. One way is to take a single IFFT, and for each transmitter, apply a multiplicative window to the time-domain channel after circularly shifting the IFFT result so the desired transmitter's channel is centered at zero in the time-domain. Then the channel is obtained by taking an FFT for each transmitter. Another approach to the filtering is in the frequency domain directly on each transmitter after removing the phase shift.

In either case, the channel for the $m^{th}$ antenna is mathematically obtained via filter 707 by applying a low pass filter to all subcarriers, $$\hat{h}_m(k) = \sum_{l=1}^{K} e^{j2\pi\beta(k-l-1)(m-1)} \hat{h}_m(k-l) g(l,k)$$

where $g(l,k), 1 \leq l \leq K$ are the channel estimation filter coefficients for the $k^{th}$ subcarrier. Note that some of the $g(l,k)$ may be zero. The channel estimates are passed from filter 707 to data demodulator 705 where demodulation of the despread data takes place. In particular, receiver 701 passes the chip stream to data despreader 703 where the chip stream is despread to produce a symbol stream. The symbol stream enters demodulator where coherent demodulation takes place utilizing channel estimates from filter 707.

Figure 8:
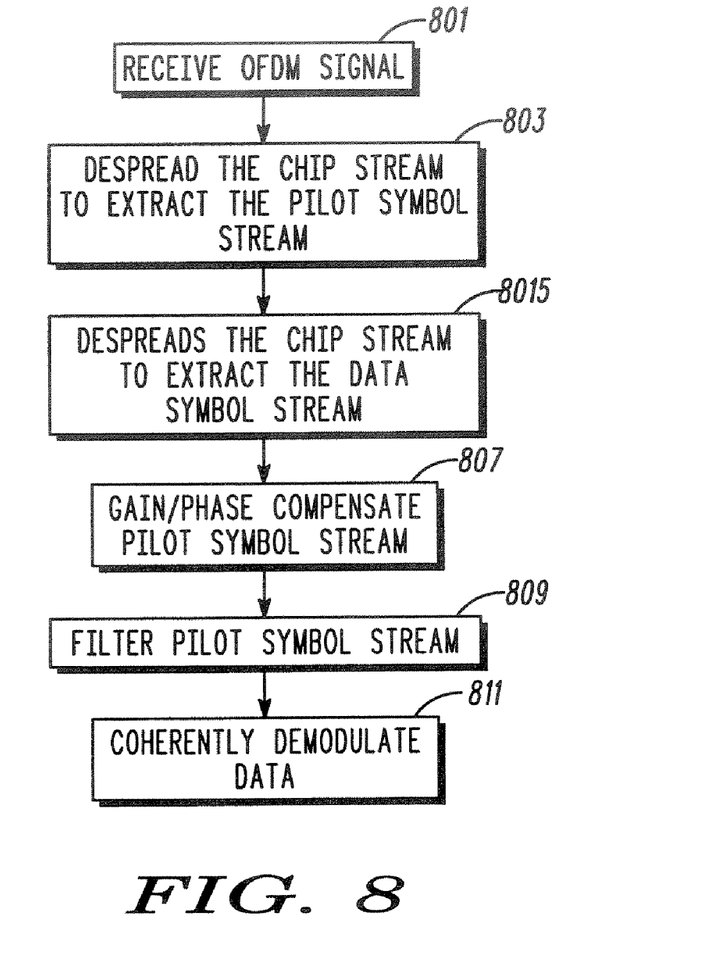
FIG. 8 is a flow chart showing operation of the receiver of FIG. 7.

FIG. 8 is a flow chart showing operation of the receiver of FIG. 7. The logic flow begins at step 801 where the OFDM signal is received by OFDM receiver 701. As discussed above, the OFDM signal comprises a plurality of subcarriers, each having a pilot signal spread with a unique pilot code, and phase shifted an amount dependent upon a transmit antenna/subcarrier. A chip stream exits receiver 701 and simultaneously enters data despreader 703 and pilot despreader 709. At step 803 pilot despreader 709 despreads the chip stream to extract the pilot symbol stream, and at step 805 data despreader 703 despreads the chip stream with a particular Walsh code to extract data symbols. At step 807, the pilot symbol stream is Gain/Phase compensated. In particular the despread pilot symbol stream is multiplied by the complex conjugate of the phase adjustments 505 for the desired transmitter in preparation for filtering via the filter 707.

Continuing, the gain and phase compensated pilot signal is output to filter 707 where filtering takes place (step 809). The resulting channel estimates are passed to demodulator 705 along with the despread data symbols, where the data symbols are coherently demodulated utilizing the channel estimates (step 811).

In alternate embodiments of the invention, variations of FIG. 3 in terms of the spreading and the mapping of the spread symbols to the subcarrier/OFDM symbol grid are possible. In one alternate embodiment, the data symbols and pilot symbol(s) may be spread with differing spreading factors, preferably based on Orthogonal Variable Spreading Factor (OVSF) codes. For example in FIG. 3 the pilot chip stream could have a spreading factor of SF_pilot=8, while the data could have a spreading factor of SF_data=16. In this case the receive processing for the pilot channel is substantially similar to the preferred embodiment with reference to FIG. 3, but the data despreading would occur over two of the SF=8 spreading blocks (such as b=1 and b=2 in FIG. 3). Therefore, this embodiment provides additional flexibility in selecting or even dynamically adjusting the spreading factor used for data. However, for this example note that the use of SF_pilot=8 blocks the use of 2 out of the 16 codes from the data channel, as is known in the art for OVSF codes. In an additional example of this alternate embodiment, the spread data with a spreading factor of 16 can be mapped onto two different subcarriers to provide two-dimensional spreading on the data, which is known in the art to provide additional frequency diversity. In this example, 8 chips of a 16 chip spreading block can be mapped to subcarrier k=1 for spreading block interval b=1, and the remaining 8 chips can be mapped to a different subcarrier (e.g., k=2 for spreading block interval b=1, k=3 for spreading block b=1 or b=2, or various other combinations).

Up to this point, the discussion has been primarily confined to the case where a pilot is spread with the same Walsh code on each of a plurality of transmitters, then phase shifted based on the transmitter/subcarrier combination and code multiplexed with user data. Then, a receiver can separate and estimate the channel between each transmitter and itself by despreading and further processing received signals in a way that takes advantage of the known phase variations of the transmitted pilot channels over multiple subcarriers. In an alternate embodiment, the invention can be used to estimate the channels between multiple transmitters and a receiver using the same spreading code on the pilot channel and by varying the phase of the pilot channels on a spreading block by block basis, based on the transmitter/block index. More particularly, each spreading block/antenna combination will share a similar pilot code on a particular subcarrier, except for the fact that the scrambled spread pilot signals will be phase shifted on some spreading block intervals of some antennas, based on the spreading block index/antenna combination, as exemplified by the following equation:

$$c_m(b,n,k)A_{P_m,m}(b,k)d_{P_m,m}(b,k)W_{P_m,m}(n,k) = c_1(b,n,k)A_{P_1,1}(b,k)$$
$$d_{P_1,1}(b,k)W_{P_1,1}(n,k) \underbrace{\exp\{-j2\pi\gamma(b-1)(m-1)\}}_{\text{transmitter and spreading block index dependent phase}}$$

where γ is a parameter less than 1, as will be described below. Note that a practical limitation exists for this alternate embodiment as compared with the preferred embodiment. In the preferred embodiment, a receiver only needs to receive one spreading block (i.e., SF OFDM symbols) of data in the time dimension (with multiple subcarriers) before the multiple channels can be estimated. However, in this alternate embodiment, a receiver must receive a plurality of (and preferably a large number of) spreading blocks in the time dimension before the multiple channels can be estimated, leading to potentially significant received signal buffering requirements as well as delays in detecting the received data. The number of channels that can be estimated in this alternate embodiment depends on the maximum Doppler spread and the OFDM symbol duration. For a system with an OFDM symbol period of Ts' (including the cyclic prefix) and a maximum two-sided Doppler spread of less than γ/Ts', the alternate embodiment will accommodate up to 1/γ transmitters (however, note that inter-subcarrier interference will begin to occur and affect the channel estimates if the Doppler spread is a significant fraction (e.g., 10%) of 1/Ts'). At the receiver, techniques similar to the ones described for the preferred embodiment can now be applied over multiple blocks in the time dimension (on each subcarrier containing a pilot) rather than over multiple subcarriers of one spreading block by exchanging the block index b for the subcarrier index k and Doppler spread for delay spread, all based on the duality principle between the time domain and the frequency domain. Also, since the delay and buffering issues can become significant for this alternate embodiment, it may be advantageous to reduce the block length by reducing the time spreading factor SF. It is even possible to use this alternate embodiment on a selected subset of subcarriers which do not use any spreading, in order to reduce the block length to the smallest possible size of 1 OFDM symbol. Note that the number of subcarriers that can be configured in this will be limited by the allowable pilot overhead for the system. Nevertheless, it is expected that for typical Doppler spreads and OFDM system parameters, this embodiment would support a much larger number of transmitters than prior-art pilot tone based methods.

While the invention has been particularly shown and described with reference to a particular embodiment, it will be understood by those skilled in the art that various changes in form and details may be made therein without departing from the spirit and scope of the invention. For example, although Walsh codes are used as an example of orthogonal spreading codes for multiplexing pilot and user data onto the same channel resources, one of ordinary skill in the art will recognize that other spreading codes, which are preferably orthogonal or have acceptably low cross correlation, can also be used. It is intended that such changes come within the scope of the following claims.

The invention claimed is:

1. A system comprising:
    a first multicarrier transmitter outputting a first spread pilot signal to a receiver, the first spread pilot signal being spread over a first spreading block interval on a first plurality of subcarriers; and
    a second multicarrier transmitter outputting a second spread pilot signal to the receiver on the first plurality of subcarriers within the spreading block interval, wherein for each of the plurality of subcarriers, the second spread pilot signal differs from the first pilot signal by a predetermined phase amount.

2. The system of claim 1 wherein the predetermined phase amount is equal to a constant value multiplied by an integer.

3. The system of claim 1 wherein the predetermined phase amount is equal to a constant value multiplied by a subcarrier index.

* * * * *